United States Patent
Pereira

(10) Patent No.: US 6,809,664 B1
(45) Date of Patent: Oct. 26, 2004

(54) DOUBLE WIDTH DATA BUS, SINGLE RATE TO SINGLE WIDTH DATA BUS, DOUBLE RATE CONVERTER CIRCUIT

(75) Inventor: David Pereira, Lisses (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/604,106

(22) Filed: Jun. 26, 2003

(51) Int. Cl.[7] .............................................. H03M 7/00
(52) U.S. Cl. .................................... 341/61; 341/50
(58) Field of Search .................... 341/50, 61; 370/545; 710/60

(56) References Cited

U.S. PATENT DOCUMENTS 5,870,038 A * 2/1999 Tomita et al. ............... 341/61
6,480,512 B1 * 11/2002 Ahn ........................... 370/545
6,516,363 B1 * 2/2003 Porter et al. ................. 710/60

* cited by examiner

Primary Examiner—Jean Bruner Jeanglaude
(74) Attorney, Agent, or Firm—Jay H. Anderson

(57) ABSTRACT

A converter circuit for converting a double width data bus (transmitting data at a single rate) to a single width data bus (transmitting data at a double rate). The circuit operates with a single clock, using the clock (positive clock) and its complement phase (negative clock) to process a set of even data and odd data. The circuit has a data mixer stage and an XOR stage. Even and odd data are mixed, using multiplexors and the positive and negative clocks, to generate mixed data. An XOR function is performed on the mixed data, using NAND gates. Using NAND gates to perform the XOR instead of a multiplexor ensures synchronous output timing, and ensures that the two stages are fully testable according to any scan-chain test method.

6 Claims, 3 Drawing Sheets

DOUBLE WIDTH DATA BUS, SINGLE RATE TO SINGLE WIDTH DATA BUS, DOUBLE RATE CONVERTER CIRCUIT

BACKGROUND OF INVENTION

The present invention relates to logic circuits for high speed data transmission and more particularly to an improved double width data bus, single rate to single width data bus, double rate converter circuit operable with a single clock.

For any data output at double rate when a single clock is used, there is a problem of unmatched delay between data going out of the rising edge or the falling edge. When only one clock is available, it is common practice to use both the rising and the falling edges of the clock signal to double the data transmission speed. FIG. 1a illustrates the basic principle of generating two successive data, e.g. d0 and d1, within a period frame when only one clock signal is used, to double the data transmission rate. As known for those skilled in the art, the rising and falling edges of the output data need to be synchronous.

A trivial variant is based upon the use of this clock signal, referred to as the positive clock, and its inverted phase referred to as the negative clock. As apparent in FIG. 1b, the edges of the positive and negative clocks need to be synchronous. FIG. 2 shows a conventional circuit referenced 10 that implements this basic principle.

Now turning to FIG. 2, let us consider data d0 and d1 for the sake of illustration (the reasoning would be the same for the subsequent pairs of even data, d2, d4, . . . and odd data d3, d5, . . . and so on). Even and odd data are simultaneously transmitted to latches 11 and 12 as input data (the generation of these input data is not detailed). Latches 11 and 12 are driven by the positive and the negative clock signals that are generated by the clock tree and the inverted clock tree 13 and 13" respectively. Let us assume that data d0 (also referred to as the positive data) and d1 (also referred to as the negative data) are sent on the double width bus 14 at single rate, then applied to multiplexor 15 driven by the main clock. Under control of multiplexor 15, data d0 and d1 are serially and alternatively sent on the single width output bus 16 at double rate for further processing. Block 17 schematically represents the standard circuits to generate the regenerated clock labeled Clock* upon which the output data d0 and d1 must be aligned. As apparent in FIG. 2, there are different paths for data d0 and d1 referred to as path#1 (positive edge path) and path#2 (negative edge path) respectively. A third path, path#3, which relates to the control of the multiplexor 15 is also of significance, the time necessary to switch from d0 to d1 is not equal to the reverse operation, i.e. to switch from d1 to d0. As a matter of fact, these paths have different output timings, and for each path, the output timing depends upon it is a rising or a falling edge. The worst path is unpredictable, since it can be either one of paths #1, #2 or #3 due to the multiplexor 15 which cannot be balanced. Another major problem lies in the timing analysis and testability of circuit 10 according to any scan-chain testability method, such as the LSSD (Level Sensitive Scan Design), because the presence of multiplexor 15. As a matter of fact, to use a clock as a data in the select input of multiplexor 15 is always a problem because there is no possibility to control it with the scan chain.

SUMMARY OF INVENTION

It is therefore a primary object of the present invention to provide an improved double width data bus, single rate to single width data bus, double rate converter circuit which does not require the use of a multiplexor but rather implements a balanced XOR function.

It is another object of the present invention to provide an improved double width data bus, single rate to single width data bus, double rate converter circuit that is fully testable and complies with any standard scan-chain based testability method.

It is another object of the present invention to provide an improved double width data bus, single rate to single width data bus, double rate converter circuit that offers identical paths to output data and thus fully synchronous output timings.

According to the present invention there is described a double width data bus, single rate to single width data bus, double rate converter circuit comprising: first and second data bus respectively transporting even data (d0, d2, d4, d6, . . . $d_n$) and odd data (d1, d3, d5, d7, . . . , $d_{n+1}$), wherein n (n=0, 2, . . . ) that are emitted at a single rate; clock generation means to generate a clock (positive clock) and its inverted phase (negative clock); means (20) for mixing said data $d_n$ and $d_{n+1}$ to generate two intermediate data derived therefrom labeled $d_n$ mix for data $d_n$ and $d_{n+1}$ mix for data $d_{n+1}$ respectively; wherein $d_n$ mix results of the multiplexing of $d_n$ and not($d_n$) by mixed data $d_{n-1}$ mix on the rising edge of the positive clock and $d_{n+1}$ mix results of the multiplexing of $d_{n+1}$ and not($d_{n+1}$) by mixed data $d_n$mix on the rising edge of the negative clock; means (21) for XORing mixed data $d_m$ mix and $d_{m+1}$ mix to generate output data $d_m$ and for XORing mixed data $d_{m+1}$mix and $d_{m+2}$mix to generate output data $d_{m+1}$ so that said output data $d_m$ and $d_{m+1}$ can be transmitted on a single width bus at double rate; and, clock generation means to generate a clock (clock*) synchronous with said output data.

According to a major aspect of the present invention, the XORing function is performed exclusively with three two-way NAND gates according to relation: XOR($d_m$mix,$d_{m+}$mix)=NAND(NAND ($d_m$mix,$d_{m+1}$mixinv),NAND ($d_m$mixinv,$d_{m+1}$mix)), wherein $d_m$mixinv=not ($d_m$mix) and $d_{m+1}$mixinv=not($d_{m+1}$mix).

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION

Figure 2:
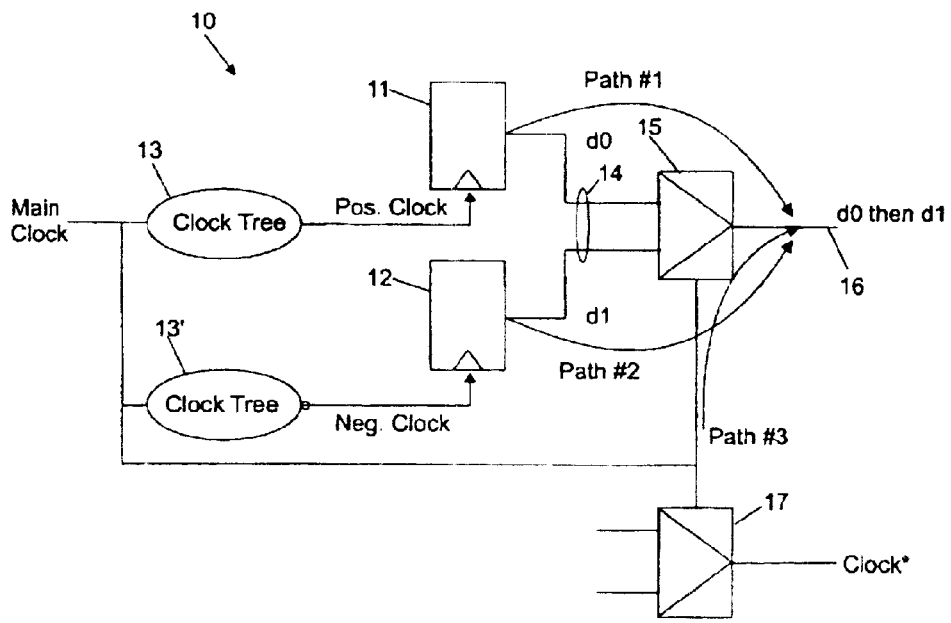
FIG. 2 shows the practical implementation of a conventional converter circuit to output data at double rate when positive and negative clocks are available to illustrate that different data paths can lead to different. output timings when a multiplexor is used in the final stage.
Figure 3:
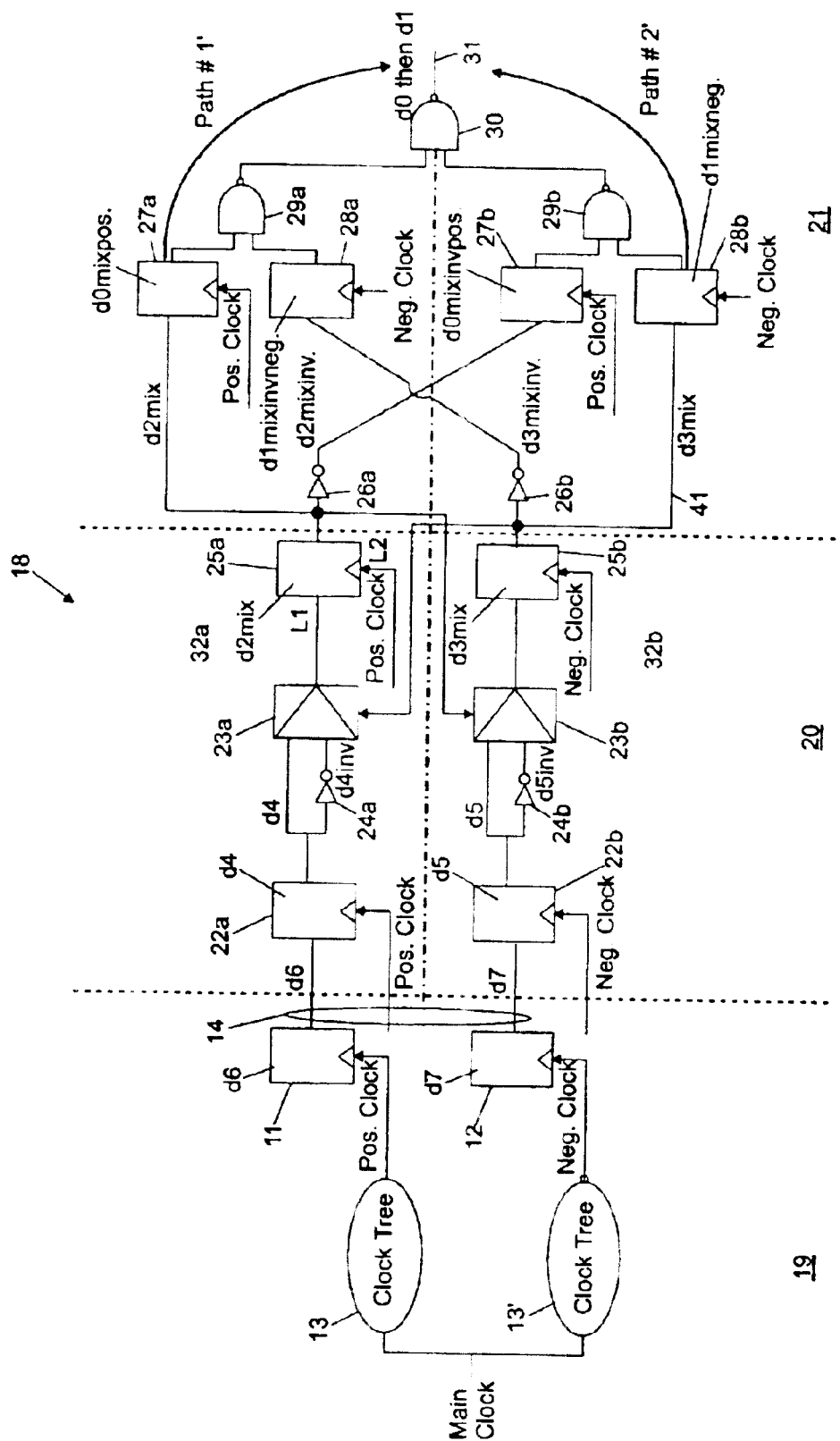
FIG. 3 shows the improved double width data bus, single rate to single width data bus, double rate converter circuit of the present invention that implements a XOR function as a whole instead of the multiplexing function to allow a fully testable design and produce synchronous output timings.

FIG. 3 shows the improved converter circuit according to the present invention that overcomes all the drawbacks and limitations of the conventional circuit 10 described by reference to FIG. 2. Data that are indicated in FIG. 3, are representative of the data present at a given cycle when data d0, then d1 are output from circuit 18. Now turning to FIG. 3, this circuit referenced 18 is basically comprised of three stages 19, 20 and 21. With the following assumptions, in the first stage 19, data d6 and d7 are held in latches 11 and 12 waiting their transmission on double width bus 14 to be latched in latch 22a of the second stage 20 in a subsequent clock cycle. At the same time, data d4 which is held in latch 22a is applied to 2-way multiplexor 23a directly on a first data input and via inverter 24a on the second data input thereof. The output of multiplexor 23a is connected to the data input of a latch 25a while the positive clock signal is applied to the clock input thereof. The data output by multiplexor 23a is labeled d4mix, its generation will be explained later on. The data held in latch 25a is labeled d2mix because it was generated by multiplexor 23 during a previous clock cycle. The same chain of circuits 22b–25b exists in the other branch to process data d7 and to generate signals d3mix. The only difference lies in that the negative clock is applied to the clock input of latches 22b and 25b. As apparent in FIG. 3, multiplexors 23a and 23b are respectively controlled by signals d3mix and d2mix to generate mixed signals d4mix and d5mix to be latched in respective latches 25a and 25b during the next clock cycle. There is therefore a symmetrical interaction in the second stage between the two chains of circuits (the upper chain processes the even data, the lower chain processes the odd data) at the multiplexing level. The mixing function of the second stage 20 basically consists to change data d4 and d5 into mixed data d4mix clocked on the rising edge of the positive clock and d5mix clocked on the rising edge of the negative clock respectively, and more generally data to change $d_n$ and $d_{n+1}$ into mixed data $d_n$mix and $d_{n+1}$mix. FIG. 3 shows an example of a circuitry performing this mixing function, however, other circuits could be designed as well.

Now considering the third stage 21 in FIG. 3, still at the same time, the mixed data to be processed in the third stage 21 are d2mix and d3mix latched in respective latches 25a and 25b. Signal d2mix is complemented in inverter 26a to generate signal d2mixinv. Likewise, signal d3mix is complemented in inverter 26b to generate signal d3mixinv. Mixed signals d2mix and d3mixinv are respectively applied to the data input of latches 27a and 28a, while the positive and negative clocks are respectively applied to their clock input. Still at this time, latches 27a and 28a hold data d0mixpos and d1mixinvneg respectively and latches 27b and 28b hold data d0mixinvpos and d1mixneg respectively. The two former data signals are applied to a two-way NAND gate 29a. The symmetrical arrangement exists, to process latter data signals that are applied to two-way NAND gate 29b. The outputs of NAND gates 29a and 29b are connected to two-way NAND gate 30. Finally, data d0 and d1 are alternatively and serially transmitted on single width bus 31, at a double rate. The role of third stage 21 is to perform a XOR function of mixed signals d0mix and d1 mix (and signals derived therefrom), preferably only using NAND gates as it will be explained later on in due course.

The main function of the data mixing mechanism performed in the second stage 20 is thus to generate two mixed data, e.g. d0mix and d1 mix, at a determined clock cycle, so that when one clock cycle later, these two data are XORed in the third stage 21, data d0 and then d1 are output from converter circuit 18, according to relation: XOR (d0mix, d1mix)=(not(d0mix)AND(d1mix)OR(d0mix)AND(not (d1mix)).

However, as known for those skilled in the art, XOR gates are unbalanced by construction due to the "not" function mentioned above performed by an embedded inverter, in one data path but not in the other one. According to the present invention, this problem is overcome, by performing the necessary inversions inside the third stage 21, explaining thereby why mixed data, d0mixinv and d1mixinv are also generated. In the third stage 21, the very same boolean function is now performed by the three twoway NAND gates 29a, 29b, and 30 shown in FIG. 3. Using the two mixed data, XORing (d0mix,d1mix) is now equal to NAND (NAND(d0mix,d1mixinv),NAND (d0mixinv,d1 mix)). Unlike XOR gates, NAND gates are balanced circuits because there is an embedded inverter performing the "not" function in each way thereof. Moreover, as apparent in FIG. 3, there is a perfect symmetry between the two sections 32a and 32b of stages 20 and 21 that processes d0 (and more generally even input data) and d1 (and more generally odd input data) respectively. As a result, because data d0, d1, . . . will be inverted twice and the circuit design symmetry, the problems mentioned above, i.e. the different output timings and the strong dependency over the rising/falling edge are eliminated. In addition, the paths for positive and negative data d0 and d1, i.e. path#1" and path#2", are now exactly the same. By construction, d0 and d1 will have the same output timings with respect to the regenerated clock (clock*), should the same mechanism described above be used to ensure that the regenerated clock and output data have the same path. The only difference is the use of different clocks (positive and negative clocks) in the upper half section 32a and in the lower half section 32b, but this difference can be well balanced and compensated in the clock tree with commercially available physical design tools.

Figure 1A:
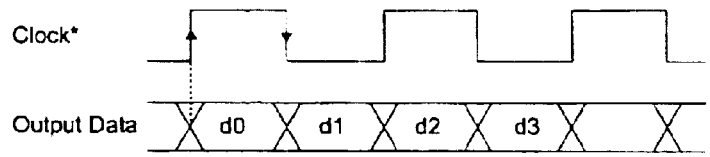
FIG. 1a is a timing diagram that shows the generation of output data on the respective rising and falling edges of a single clock signal to send data at double rate.
Figure 1B:
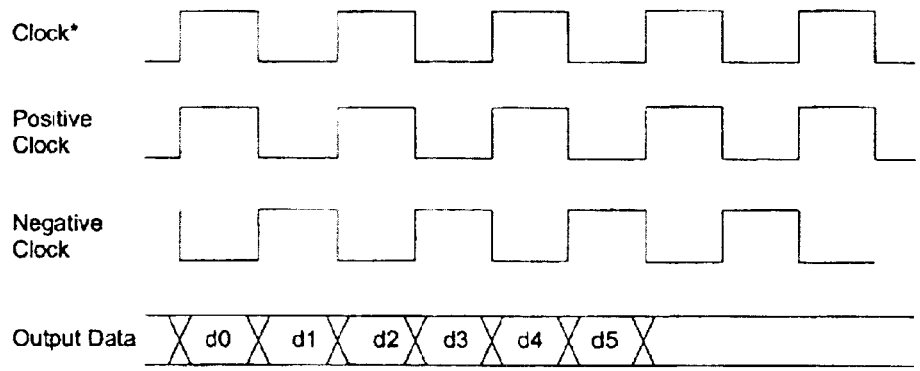
FIG. 1b is a timing diagram that shows the generation of output data on the rising edge of the positive and negative clocks to send data at double rate.
Figure 4:
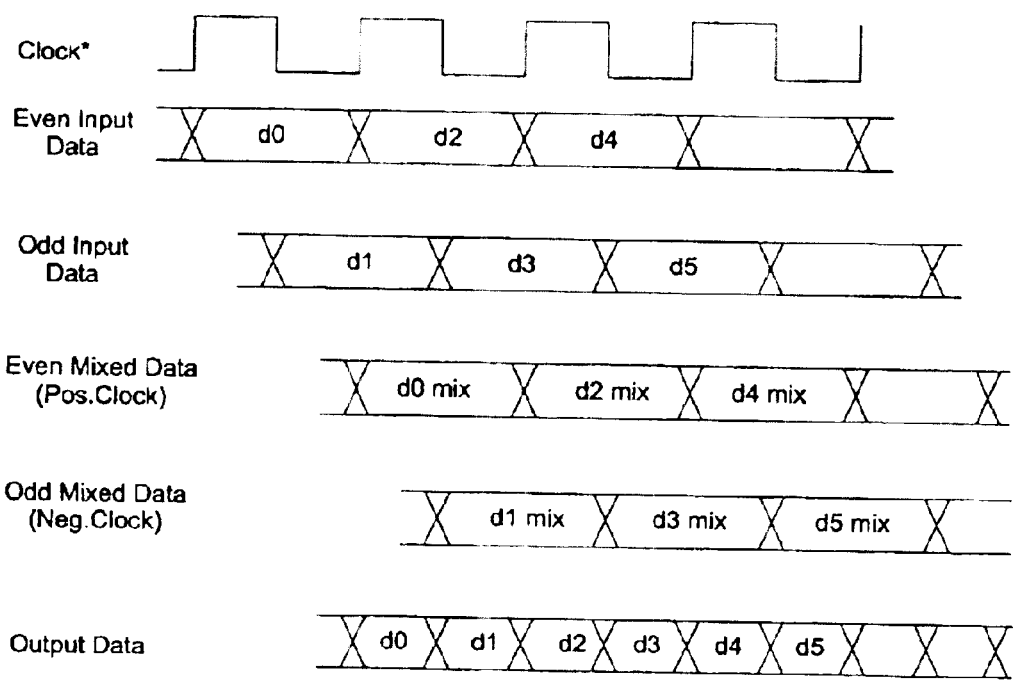
FIG. 4 is a timing diagram that shows the generation of output data (and some intermediate data) on the rising edge of positive and negative clocks when the improved converter circuit of FIG. 3 is used.

FIG. 4 shows the waveforms of the signals in consideration with respect to the regenerated clock (Clock*). Now turning to FIG. 4, there are shown the sets of even and odd input data that are clocked by the rising and falling edges of the positive and negative clock signal respectively (see FIG. 1b), which in turn determine the timing of the even and odd mixed data. Still referring to FIG. 4, for instance, we see that XORing d1 mix and d3mix generates output data d2, then XORing d2mix and d3mix generates output data d3, data d2 is followed by data d3 because they are clocked by the rising edge of the positive and negative clocks respectively. To ensure that XOR(d2mix,d3mix) is equal to d3, it is necessary that when d2mix is equal to 1 d3mix is equal to not(d3) and when d2mix is equal to 0, d3mix is equal to d3. This result is obtained thanks to the particular structure of the second stage 20 depicted in FIG. 3 and results of the cross connection of the select input of multiplexors 23a and 23b. This way, each mixed signal can be computed knowing the current state, and the previous data state on the opposite clock. For instance, d4mix is obtained from both d4 (the current state on the negative clock) and d3mix (on the positive clock). Likewise, d5mix can be computed from d5 and d4mix and so on.

Improved converter circuit 18 has a number of advantages. It is a fully synchronous design. Because the main clock is not used as a data (a multiplexor is no longer required), it is fully testable according to any scan-chain test method, including the well-known LSSD technique, so that every part of the design can be controlled and observed. Output timings can also be easily controlled. Positive and negative paths, path#1 " and path#2" are going through exactly the same number of identical circuits/logic gates. Finally, thanks to the double inversion performed in NAND 29*a* (NAND 29*b*) then in NAND 30, rising or falling edges of the output data will have the same timings or at least the difference therebetween will be minimized.

While the invention has been particularly described with respect to a preferred embodiment thereof it should be understood by one skilled in the art that the foregoing and other changes in form and details may be made therein without departing from the spirit and scope of the

What is claimed is:

1. A converter circuit for converting a double width data bus transmitting data at a single rate to a single width data bus transmitting data at a double rate, the converter circuit comprising:

a first data bus and a second data bus respectively transporting first data characterized as even data represented by d0, d2, d4, d6, ... $d_n$ and second data characterized as odd data represented by d1, d3, d5, d7, ... $d_{n+1}$, where n=0, 2, ..., the even data and the odd data being emitted at a single rate;

a first clock generator for generating a first clock, characterized as a positive clock, and an inverted phase thereof, characterized as a negative clock;

a data mixer for mixing even data $d_n$ and odd data $d_{n+1}$ to generate two mixed data characterized as $d_n$mix and $d_{n+1}$mix respectively, wherein $d_n$mix is a result of multiplexing of $d_n$ and inverted data NOT($d_n$) by mixed data $d_{n-1}$mix on a rising edge of the positive clock and $d_{n+1}$mix is a result of multiplexing of $d_{n+1}$ and inverted data NOT($d_{n+1}$) by mixed data $d_n$mix on a rising edge of the negative clock;

an XOR circuit for performing an XOR function on mixed data $d_n$mix and $d_{n+1}$mix to generate first output data and for performing an XOR function on mixed data $d_{n+1}$mix and $d_{n+2}$mix to generate second output data, to enable transmission of the first output data and the second output data on a single width data bus at a double rate; and a second clock generator for generating a second clock synchronous with the first output data and the second output data.

2. A converter circuit according to claim 1, wherein said XOR circuit comprises three two-way NAND gates so that the XOR function is performed according to the relation:

XOR($d_n$mix, $d_{n+1}$mix)=NAND(NAND($d_n$mix, $d_{n+1}$mixinv), NAND($d_n$mixinv, $d_{n+1}$mix))

wherein $d_n$mixinv=NOT($d_n$mix) and $d_{n+1}$mixinv=NOT($d_{n+1}$mix).

3. A converter circuit according to claim 1, wherein said data mixer further comprises:

a first data mixer latch having a clock input and a data input coupled to said first data bus to latch even data;

a first multiplexor coupled to said first data mixer latch, said first multiplexor having as data inputs an output of said first data mixer latch and the complement thereof, and having a control input characterized as a first control input;

a second data mixer latch having a clock input and a data input coupled to said first multiplexor to latch an output of said first multiplexor at a next clock cycle, the clock inputs of said first data mixer latch and said second data mixer latch being configured to receive the positive clock;

a third data mixer latch having a clock input and a data input coupled to said second data bus to latch odd data;

a second multiplexor coupled to said third data mixer latch, said second multiplexor having as data inputs an output of said third data mixer latch and the complement thereof, and having a control input characterized as a second control input;

a fourth data mixer latch having a clock input and a data input coupled to said second multiplexor to latch an output of said second multiplexor at a next clock cycle, the clock inputs of said third data mixer latch and said fourth data mixer latch being configured to receive the negative clock;

wherein the first control input is connected to an output of said fourth data mixer latch and the second control input is connected to an output of said second data mixer latch, so as to generate data $d_n$mix at the output of said second data mixer latch and data $d_{n+1}$mix at the output of said fourth data mixer latch.

4. A converter circuit according to claim 1, wherein said XOR circuit comprises:

a first inverter for generating the complement of data $d_n$mix characterized as $d_n$mixinv;

a second inverter for generating the complement of data $d_{n+1}$mix characterized as $d_{n+1}$mixinv;

a first XOR circuit latch having a clock input coupled to the positive clock and a data input given by $d_n$mix;

a second XOR circuit latch having a clock input coupled to the negative clock and a data input given by $d_{n+1}$mixinv;

a first NAND gate connected to outputs of said first XOR circuit latch and said second XOR circuit latch respectively;

a third XOR circuit latch having a clock input coupled to the positive clock and a data input given by $d_n$mixinv;

a fourth XOR circuit latch having a clock input coupled to the negative clock and a data input given by $d_{n+1}$mix;

a second NAND gate connected to outputs of said third XOR circuit latch and said fourth XOR circuit latch respectively; and a third NAND gate connected to outputs of said first NAND gate and said second NAND gate respectively.

5. A converter circuit according to claim 2, wherein said XOR circuit comprises:

a first inverter for generating the complement of data $d_n$mix characterized as $d_n$mixinv;

a second inverter for generating the complement of data $d_{n+1}$mix characterized as $d_{n+1}$mixinv;

a first XOR circuit latch having a clock input coupled to the positive clock and a data input given by $d_n$mix;

a second XOR circuit latch having a clock input coupled to the negative clock and a data input given by $d_{n+1}$mixinv;

a first NAND gate connected to outputs of said first XOR circuit latch and said second XOR circuit latch respectively;

a third XOR circuit latch having a clock input coupled to the positive clock and a data input given by $d_n$mixinv;

a fourth XOR circuit latch having a clock input coupled to the negative clock and a data input given by $d_{n+1}$mix;

a second NAND gate connected to outputs of said third XOR circuit latch and said fourth XOR circuit latch respectively; and a third NAND gate connected to outputs of said first NAND gate and said second NAND gate respectively.

6. A converter circuit for converting a double width data bus transmitting data at a single rate to a single width data bus transmitting data at a double rate, the converter circuit comprising:

a first data bus and a second data bus respectively transporting first data characterized as even data represented by d0, d2, d4, d6, ... $d_n$ and second data characterized as odd data represented by d1, d3, d5, d7, ... $d_{n+1}$, where n=0, 2, ..., the even data and the odd data being emitted at a single rate;

a clock generator for generating a first clock, characterized as a positive clock, and an inverted phase thereof, characterized as a negative clock;

a first data latch having a clock input and a data input coupled to said first data bus to latch even data;

a first multiplexor coupled to said first data latch, said first multiplexor having as data inputs an output of said first data latch and the complement thereof, and having a control input characterized as a first control input;

a second data latch having a clock input and a data input coupled to said first multiplexor to latch an output of said first multiplexor at a next clock cycle, the clock inputs of said first data latch and said second data latch being configured to receive the positive clock;

a third data latch having a clock input and a data input coupled to said second data bus to latch odd data;

a second multiplexor coupled to said third data latch, said second multiplexor having as data inputs an output of said third data latch and the complement thereof, and having a control input characterized as a second control input;

a fourth data latch having a clock input and a data input coupled to said second multiplexor to latch an output of said second multiplexor at a next clock cycle, the clock inputs of said third data latch and said fourth data latch being configured to receive the negative clock;

wherein the first control input is connected to an output of said fourth data latch and the second control input is connected to an output of said second data latch, so as to generate data $d_n$mix at the output of said second data latch and data $d_{n+1}$mix at the output of said fourth data latch;

a first inverter for generating the complement of data $d_n$mix characterized as $d_n$mixinv;

a second inverter for generating the complement of data $d_{n+1}$mix characterized as $d_{n+1}$mixinv;

a fifth data latch having a clock input coupled to the positive clock and a data input given by $d_n$mix;

a sixth data latch having a clock input coupled to the negative clock and a data input given by $d_{n+1}$mixinv;

a first NAND gate connected to outputs of said fifth data latch and said sixth data latch respectively;

a seventh data latch having a clock input coupled to the positive clock and a data input given by $d_n$mixinv;

an eighth data latch having a clock input coupled to the negative clock and a data input given by $d_{n+1}$mix;

a second NAND gate connected to outputs of said seventh data latch and said eighth data latch respectively; and a third NAND gate connected to outputs of said first NAND gate and said second NAND gate.

* * * * *